US008873538B2

United States Patent
Chan et al.

(10) Patent No.: US 8,873,538 B2
(45) Date of Patent: Oct. 28, 2014

(54) SYSTEM AND METHOD FOR SUPPORTING MOBILE NODE MOBILITY

(75) Inventors: Hinghung Anthony Chan, Plano, TX (US); Zhixian Xiang, Plano, TX (US)

(73) Assignee: Futurewei Technologies, Inc., Plano, TX (US)

( * ) Notice: Subject to any disclaimer, the term of this patent is extended or adjusted under 35 U.S.C. 154(b) by 294 days.

(21) Appl. No.: 13/234,989

(22) Filed: Sep. 16, 2011

(65) Prior Publication Data

US 2012/0087357 A1  Apr. 12, 2012

Related U.S. Application Data (60) Provisional application No. 61/391,026, filed on Oct. 7, 2010.

(51) Int. Cl.
*H04L 12/28* (2006.01)
*H04W 40/24* (2009.01)
*H04L 12/56* (2006.01)
*H04W 80/04* (2009.01)

(52) U.S. Cl.
CPC ............. *H04W 40/24* (2013.01); *H04W 80/04* (2013.01)
USPC .......................................... 370/351; 370/401

(58) Field of Classification Search
None
See application file for complete search history.

(56) References Cited

U.S. PATENT DOCUMENTS

| | | | |
|---|---|---|---|
| 2002/0080752 A1* | 6/2002 | Johansson et al. | 370/338 |
| 2007/0081512 A1* | 4/2007 | Takeda et al. | 370/349 |
| 2008/0256220 A1* | 10/2008 | Bachmann et al. | 709/222 |
| 2010/0189000 A1* | 7/2010 | Hirano et al. | 370/252 |
| 2011/0080866 A1 | 4/2011 | Chan et al. | |
| 2011/0080872 A1 | 4/2011 | Chan et al. | |

* cited by examiner

*Primary Examiner* — Eunsook Choi (74) *Attorney, Agent, or Firm* — Slater & Matsil, L.L.P.

(57) ABSTRACT

A system and method for supporting mobile node mobility are provided. A method for delivering a packet to a communications device having a destination address includes retrieving information related to the destination address from a second layer of a local portion of a distributed route information database, where the information includes binding information about the destination address and a care of address for the communications device in a visiting network to which the communications device is connected. The method also includes tunneling the first packet to the care of address.

21 Claims, 7 Drawing Sheets

SYSTEM AND METHOD FOR SUPPORTING MOBILE NODE MOBILITY

This application claims the benefit of U.S. Provisional Application No. 61/391,026, filed on Oct. 7, 2010, entitled "Distributed Mobility Function," which application is hereby incorporated herein by reference.

TECHNICAL FIELD

The present invention relates generally to digital communications, and more particularly to a system and method for supporting mobile node mobility.

BACKGROUND

Wireless communications systems have provided great flexibility and freedom to users. No longer are users needlessly tied to fixed access locations in order to communicate, share information, and so forth, effectively and rapidly. Instead, the users, through the use of a mobile device or mobile node, may be free to move practically anywhere within a coverage area of the wireless communications system and still be able to communicate, access information, and so on. The mobile nodes provide a degree of mobility to the users.

Mobility management may be used in cellular networks, wide area networks, as well as other wireless networks. Manufacturers and operators of wireless communications systems have developed mobility management protocols to enable and optimize handovers and/or handoffs from one network to another, to maximize a coverage area of a particular environment or network made up of number of smaller wireless communications networks.

Normally, each mobile node (MN) may have its own Internet Protocol (IP) address. The IP address is used to transmit between the mobile node and another device. In order to serve a mobile device while it is travelling (or roaming) from its home network (HN) to a visited network (VN), Mobile IP has been proposed by the Internet Engineering Task Force (IETF) to allow mobile nodes to move between networks while maintaining a permanent IP address.

A version of Mobile IP is Mobile IP version 6 (MIPv6). In a MIPv6 based communication system, a mobile node has a home address (HoA) assigned to it when it initially attached to its HN. When the mobile node changes its location and moves into a VN, it receives a care-of address (CoA) from the VN. In a MIPv6 mobile network, the mobile node then sends a binding update to a home agent (HA) in its HN. The binding update causes the HA to establish a binding between the HoA and the CoA. Subsequently, the HN forwards data packets destined for the mobile node's HoA to the mobile node's current CoA.

However, routing traffic through the HA to the mobile node when the mobile node is in the VN may lead to an unnecessarily longer route, fraught with extended delays, increased latency, greater probability for errors, increased resource utilization, and so on. Therefore, there is a need for a system and method for supporting mobile node mobility that can shorten the routing of traffic to the mobile node when it is in the VN.

SUMMARY OF THE INVENTION

These and other problems are generally solved or circumvented, and technical advantages are generally achieved, by example embodiments of the present invention which provides a system and method for supporting mobile node mobility.

In accordance with an example embodiment of the present invention, a method for delivering a packet to a communications device having a destination address is provided. The method includes retrieving information related to the destination address from a second layer of a local portion of a distributed route information database, where the information includes binding information about the destination address and a care of address for the communications device in a visiting network to which the communications device is connected. The method also includes tunneling the packet to the care of address, where at the visiting network, the packet is further forwarded to the communications device.

In accordance with another example embodiment of the present invention, a method for delivering a packet to a communications device having a destination address is provided. The method includes determining a care of address of the communications device, and tunneling the packet to a network where the communications device is connected, where the network is a visiting network of the communications device. The method also includes storing information related to the destination address to a first layer of a local portion of a distributed route information database.

In accordance with another example embodiment of the present invention, a network entity is provided. The network entity includes a mobility function unit, and a gateway function unit. The mobility function unit retrieves information related to a destination address of a communications device for a packet destined for the communications device having the destination address, where the information is retrieved from a second layer of a local portion of a distributed route information database, and where information comprises binding information about the destination address and a care of address for the communications device in a visiting network to which the communications device is connected. The gateway function unit tunnels the packet to the care of address, where at the visiting network, the packet is further forwarded to the communications device.

In accordance with another example embodiment of the present invention, a network entity for delivering a packet to a communications device having a destination address is provided. The network entity includes a mobility unit and a gateway unit. The mobility unit determines a care of address of the communications device and stores information related to the destination address to a first layer of a local portion of a distributed route information database. The gateway unit tunnels the packet to a network where the communications device is connected, where the network is a visiting network of the communications device.

One advantage disclosed herein is that unnecessarily long routes between nodes are avoided. Avoiding long routes allow for an optimization of a path between nodes and a more efficient use of resources.

A further advantage of exemplary embodiments is that relatively few modifications to existing entities are required. Furthermore, the modifications are small. Therefore, implementation of the exemplary embodiments may be achieved quickly and at little cost.

The foregoing has outlined rather broadly the features and technical advantages of the present invention in order that the detailed description of the embodiments that follow may be better understood. Additional features and advantages of the embodiments will be described hereinafter which form the subject of the claims of the invention. It should be appreciated by those skilled in the art that the conception and specific embodiments disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawing, in which.

DETAILED DESCRIPTION OF ILLUSTRATIVE EMBODIMENTS

The making and using of the current example embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

One example embodiment of the invention relates to delivering a packet to a communications device with a destination address when the communications device is no longer connected to its home network. For example, information related to the destination address is retrieved from a local memory when a packet destined for the communications address is to be routed. The information includes binding information for the destination address and a care of address of the communications device, and the packet is sent directly to the care of address of the communications address. At a management entity at a home network of a communications device that has connected to a visiting network, a care of address of the communications device is found and a packet destined for the communications device is sent to the care of address. Information related to a binding of the destination address and a network entity of the visiting network is stored in a local memory.

The present invention will be described with respect to example embodiments in a specific context, namely a communications system that uses a Mobile IP communications protocol. The invention may also be applied, however, to other communications systems that allow mobile nodes to retain a permanent address as the mobile nodes move between networks.

Figure 1:
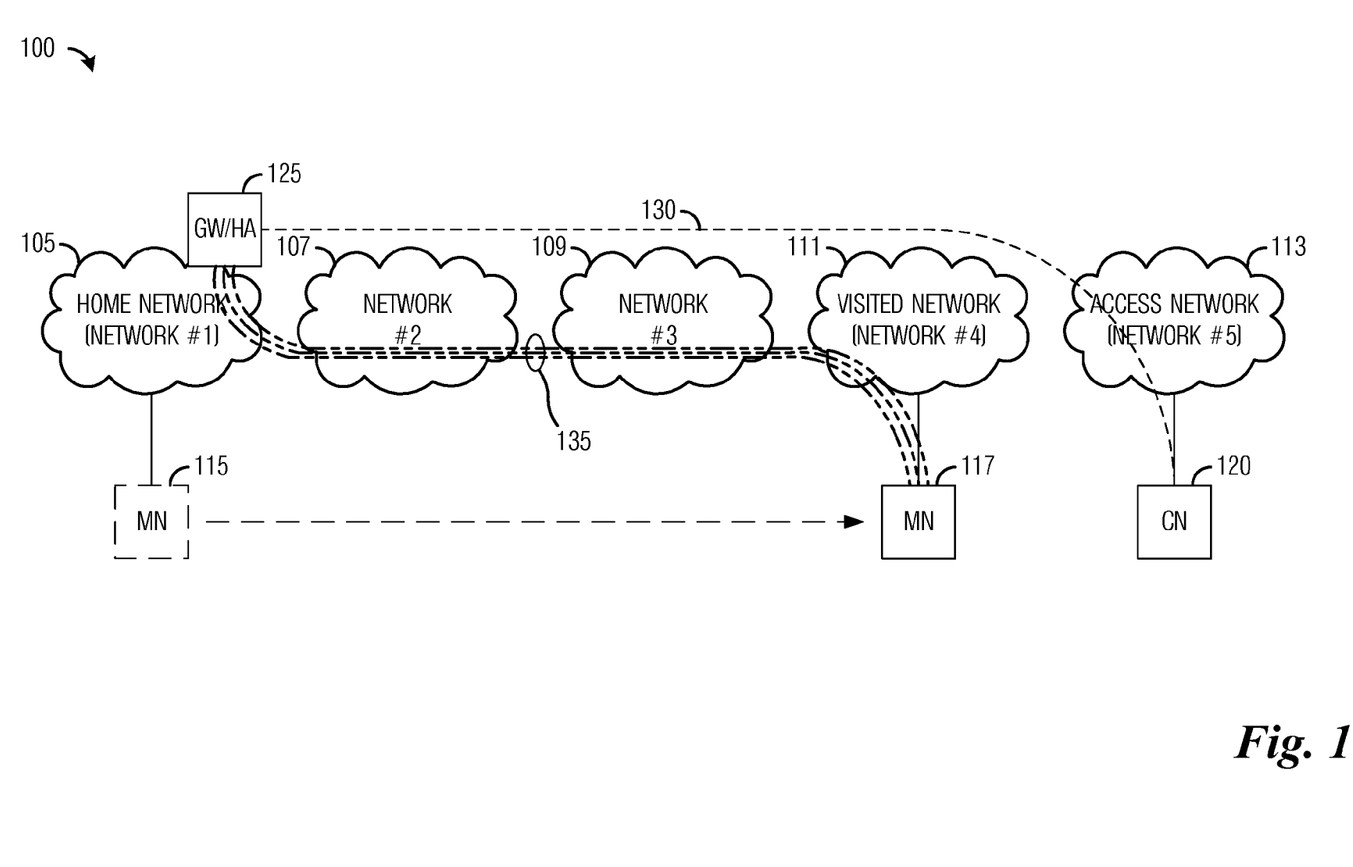
FIG. 1 illustrates an example communications system, highlighting a technique for routing packets to a mobile node.

FIG. 1 illustrates a communications system 100, highlighting a technique for routing packets to a mobile node. Communications system 100 makes use of Mobile IP and includes a number of networks, including network #1 105, network #2 107, network #3 109, network #4 111, and network #5 113. Communications system 100 also includes a MN 115, which initially registered with network #1 105, making network #1 105 the HN for MN 115. Communications system 100 also includes a CN 120, accessing communications system 100 through network #5 113.

While it is understood that communications systems may employ multiple networks capable of communicating with a number of MNs and CNs, only five networks, one MN, and one CN are illustrated for simplicity.

Through its registration with network #1 105, MN 115 is assigned a home address (HoA). A mobility anchor, also commonly referred to as an HA, may be used to maintain information about the mobility of MN 115. The combination HA and GW is shown in FIG. 1 as GW/HA 125. GW/HA 125 operates in the HN of MN 115, i.e., network #1 105, and intercepts packets addressed to the HoA from a source node, such as CN 120, and forwards the packets to the CoA.

If MN 115, through its mobility, changes its network, from its current network (i.e., network #1 105) to a new network (network #4 111, for example), MN 115 may be assigned a care of address (CoA) by an HA in its new network. It is noted that MN 115, while operating in its new network, is shown in FIG. 1 as MN 117 to prevent confusion. However, packets intended for MN 117 (formerly MN 115) may still be addressed to the HoA of MN 117 and are therefore routed to GW/HA 125 via route 130, which may then tunnel (through tunnel 135) the packets to the new network (network #4 111, for example) of MN 117 and eventually to MN 117.

As shown in FIG. 1, a path taken by packets from CN 120 to MN 117 may be less than optimal. Instead of going directly from network #5 113 to network #4 111 and then to MN 117, packets must go through a number of networks to get to GW/HA 125 of network #1 105 and then to network #4 111 and eventually to MN 117.

According to an example embodiment, it may be possible to avoid unnecessarily long routes, for example, in terms of routing distance and/or routing time, by having a mobility routing function (MF) in each network of a communications system. The MF may be used to keep track of how to route packets to the MN in order to enable the reach ability of the MN as the MN moves to other networks. In other words, the MF may implement mobility routing (MR) functionality. As an example, a MF may be co-located at or with a GW of each network. Because the GW of a network may serve as an access point from the network to other networks and vice versa, the GW may be a good location to locate the MF.

Figure 2:
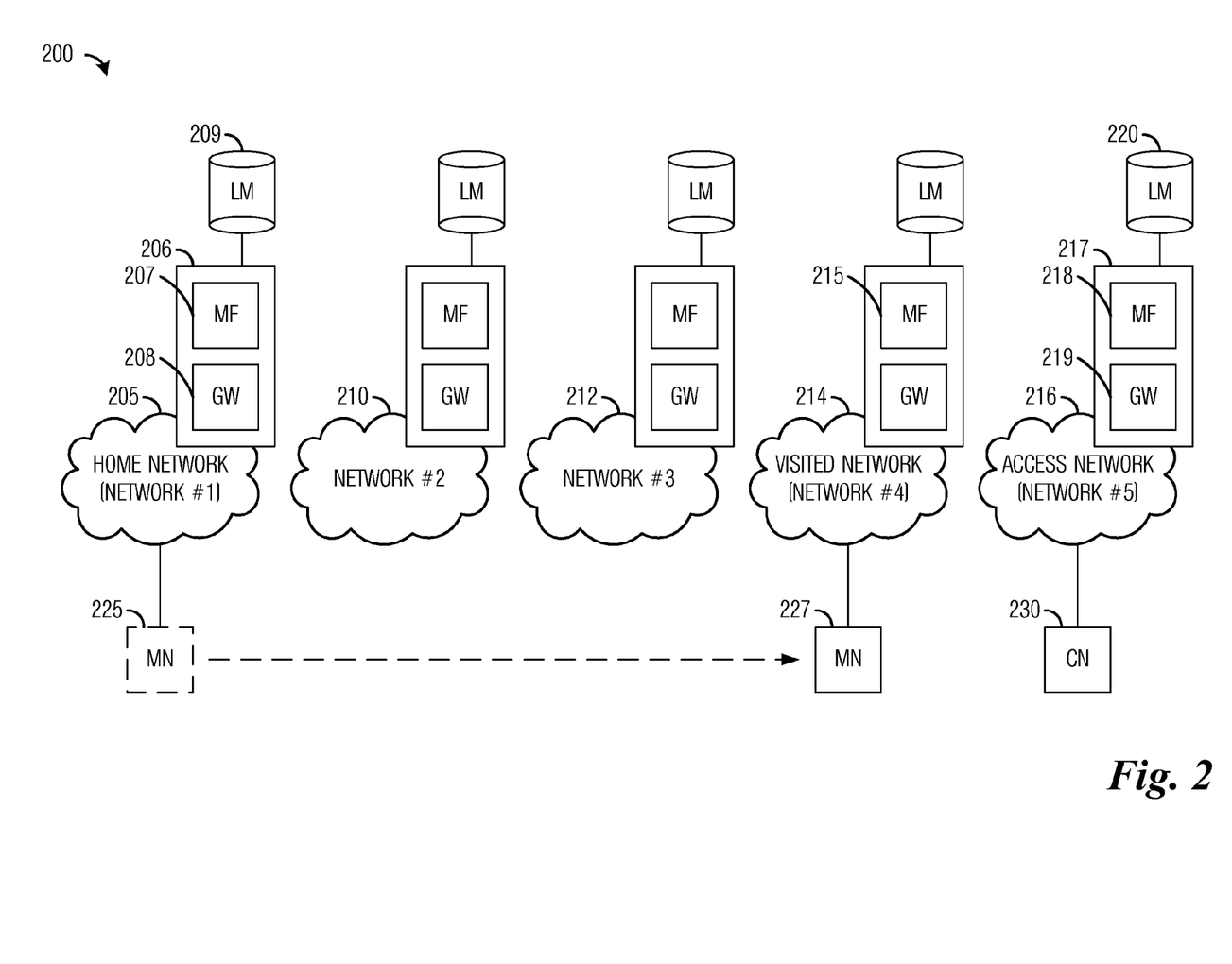
FIG. 2 illustrates an example communications system with multiple networks, wherein each network has a MF co-located with a GW according to example embodiments described herein.

FIG. 2 illustrates a communications system 200 with multiple networks, wherein each network has a MF co-located with a GW. Communications system 200 includes a number of networks, such as network #1 205, network #2 210, network #3 212, network #4 214, and network #5 216. Each network includes an entity comprising a GW and a co-located MF, for example, network #1 205 includes an entity 206 with a MF 207 and a GW 208. Similarly, network #5 216 includes an entity 217 with a MF 218 and a GW 219.

Each network also includes a Location Management Entity (LM), for example, LM 209 of network #1 205 and LM 220 of network #5 216, that may be responsible for maintaining routing addresses of MNs as they move about, and managing the maintenance of bindings between the HoA and the GWs. The LM of a network may maintain binding information for a MN(s) that was originally assigned a HoA by the network (in other words, the MN was initially attached to the network) and then moved onto a VN. If the MN has moved to a VN, then the LM may maintain a binding between the HoA of the MN and the GW of the VN to which the MN is attached. In general, if the MN remains in the network, then the LM may not need to maintain binding information for the MN.

A LM may be implemented as a database, as an example. Since there is a LM at each network, the information maintained by each LM may be a part of a distributed database, such as a distributed routing information database (DRID), which will be presented in greater detail below.

Although shown in FIG. 2 as being a separate network entity from the entity comprising a GW and a co-located MF and is accessible by the entity, the LM may also be co-located with the GW and the MF.

Communications system 200 also includes a MN 225, which may be initially connected to network #1 205, which may assign a HoA to MN 225. The HoA may be used to route packets to MN 225 while MN 225 remains attached to network #1 205.

As MN 225 moves about, it may become connected to network #4 214 (it is noted that MN 225 is shown as MN 227 when connected to network #4 214 to prevent confusion when referencing the MN), which may assign MN 227 a new address, e.g., an IP address, known as care-of-address (CoA). It is noted that the HoA of MN 227 does not change as MN 227 (MN 225) moves about. A MF 215 of network #4 214 may maintain information about MN 227, including its HoA and new CoA, to ensure that packets continue to be delivered correctly. Coordination between MF 215 and MF 207 may be needed to maintain correct mobility information.

According to an example embodiment, the LMs in communications system 200 may maintain and use a DRID. When a MN moves away from its HN to a new network, i.e., a VN, but needs to continue to use the HoA, the LM of the HN may maintain a binding between the HoA and an AR at the VN.

Each network and/or subnet may maintain route information of the MNs that uses the subnet prefix of that network and/or subnet. The route information in all the networks collectively forms the DRID for the visiting MNs and enable the visiting MNs to be reachable at the HoA of the MNs.

As an illustrative example, consider a CN 230 that transmits a packet destined for the HoA of MN 225. The packet may be routed to GW 208 of network #1 205 based on the HoA of MN 225. MF 207 may check its information regarding MN 225 and note that MN 225 is no longer connected to network #1 205. Instead, MN 225 (MN 227) is now connected to network #4 214. MF 207 may access the DRID in LM 209 to access binding information between the HoA of MN 225 and an AR of network #4 214. GW 208 may then send the packet to the AR of network #4 214, using a tunnel, for example, where the AR determines that MN 227 (corresponding to the CoA of MN 225) is connected to it and delivers the packet to MN 227.

According to an example embodiment, an initial route taken by a packet to a MN may comprise an unnecessarily long path such as a route discussed previously. However, once information in the DRID is updated, subsequent packets to the MN may be shorter. LMs in each network may perform the updating of the information in the DRID. Furthermore, MF/GWs in each network may also maintain their own portions of the DRID to help minimize routing delay.

According to an example embodiment, the DRID may be configured in a hierarchical manner with multiple layers. For example, in a first layer of the DRID, the LMs of each network in the communications system may maintain bindings between HoAs and GWs of VNs for MNs that were initially connected to their respective networks. The binding information in the LMs may allow the MF/GW of a HN of a MN to tunnel packets addressed to the HoA to the MF/GW of the VN.

For example, in a second layer of the DRID, the MF/GW maintains bindings between HoAs and ARs so that upon receipt of packets addressed to the HoA, the MF/GW may tunnel the packets to an AR, which may then forward the packets to the MN. In general, the MF/GW of a network in the communications system may only need the binding information stored in the second layer of the DRID when it receives a packet from a CN that is destined for a MN that has moved away from its HN and onto a VN (the network).

Since the second layer of the DRID may be used to maintain bindings between HoAs and ARs of a subset of packets passing through the MF/GW, the second layer of the DRID may be kept relatively small to avoid unnecessarily utilizing too much memory. Furthermore, in the interest of minimizing routing delay, the second layer of the DRID may be configured and accessed like a cache memory to speed up access to the second layer of the DRID. Additionally, cache memory management techniques, such as entry aging, entry insertion, and/or entry deletion, may be used to keep the size of the second layer of the DRID small and maintain efficient access.

FIGS. 3a through 3d illustrate messages exchanged in a communications system 300 as packets are sent to a MN that has moved away from its home network. As shown in FIGS. 3a through 3d, messages transmitted between various entities in communications system 300 are highlighted as packets are routed from a CN to a MN, wherein the MN has moved away from its HN to a VN, but has kept its HoA. A DRID is maintained in communications system 300 to optimize the routes taken by the packets.

Figure 3A:
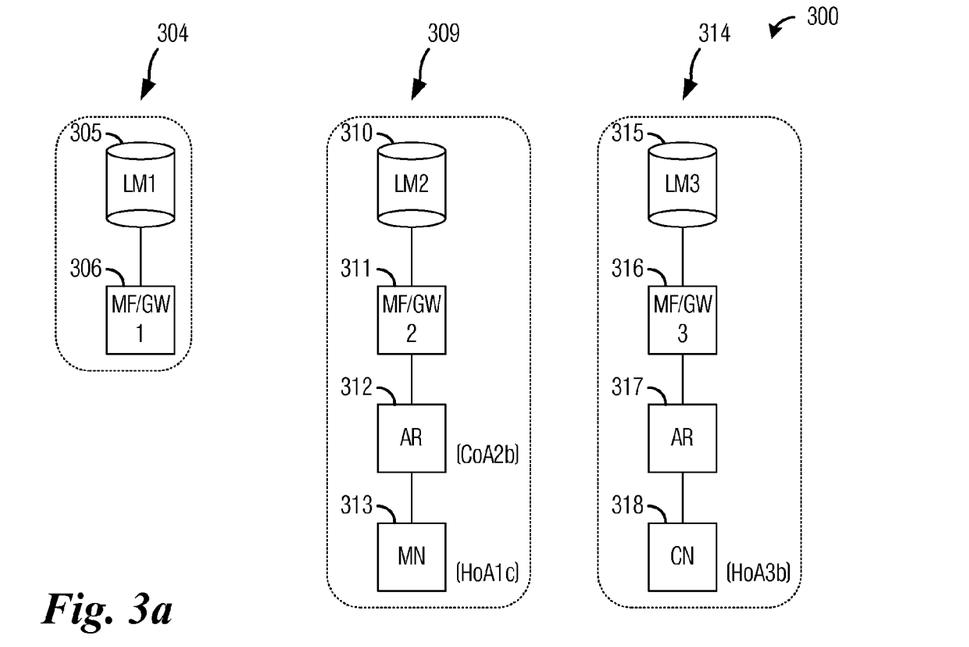
FIGS. 3a through 3d illustrate examples of messages exchanged in a communications system as packets are sent to a MN that has moved away from its HN according to example embodiments described herein.

FIG. 3a illustrates entities in communications system 300. As shown in FIG. 3a, there are three networks in communications system 300, with highlight 304 denoting network #1, highlight 309 denoting network #2, and highlight 314 denoting network #3. In general, each network comprising an LM, a MF/GW, an access router (AR), and a communications device (such as a MN or CN). For example, network #2 comprises a LM2 310, MF/GW2 311, an AR 312, and a MN 313. Similarly, network #3 comprises a LM3 315, MF/GW3 316, an AR 317, and a CN 318. In order to maintain simplicity of FIG. 3a, since there is no MN illustrated in network #1, an AR and a MN or CN are not illustrated for network #1. Rather, network #1 is shown with only a LM1 305 and a MF/GW1 306.

While it is understood that communications systems may employ multiple networks capable of communicating with a number of MNs and CNs, only three networks, one MN, and one CN are illustrated for simplicity.

For discussion purposes, consider a situation where MN 313 that is attached to network #2, but MN 313 was initially registered with network #1. When it initially registered in communications system 300 with network #1, MN 313 was assigned a HoA of HoA1c, as an example. Furthermore, consider that AR 312 is assigned an IP address of CoA2b. MF/GW2 311 may maintain a binding between addresses HoA1c and CoA2b.

Figure 3B:
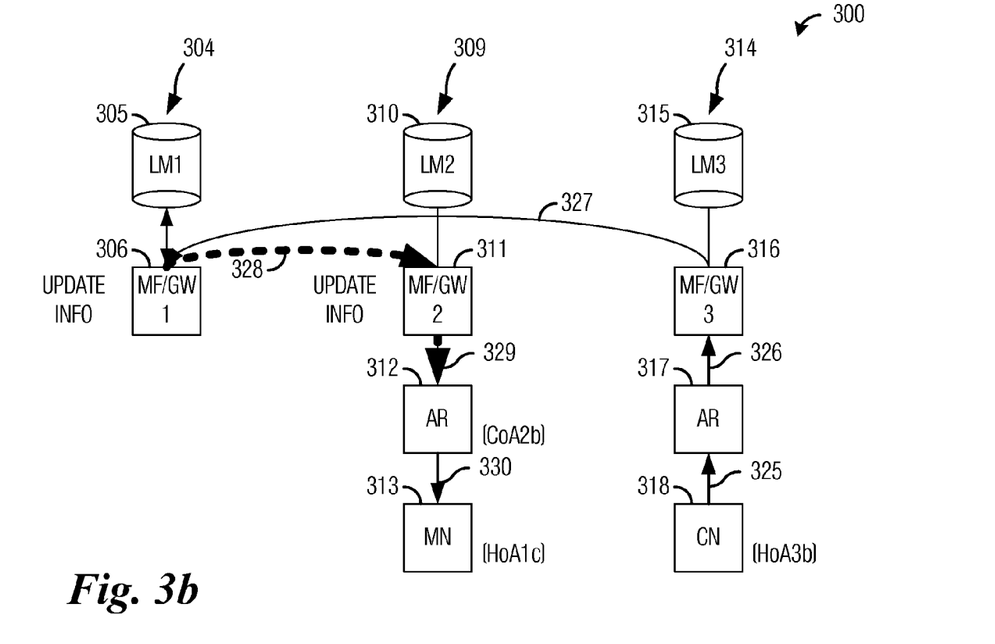

FIG. 3b illustrates messages exchanged in communications system 300 when CN 318 with HoA of HoA3b in network #3 sends a packet with destination HoA1c, i.e., MN 313. The packet is sent to AR 317 (shown as event 325), which then sends the packet to MF/GW3 316 (shown as event 326). MF/GW3 316 may optionally determine whether route optimization is needed. For example, using neighbor route advertisement, MF/GW3 316 may know whether or not a route between MF/GW3 316 and MF/GW1 306 is a short route or a long route.

Generally, the route may either be a short route or a long route, wherein a long route may take a relatively longer time to get the packet to its destination, while a short route is a route that transverses a path that is only about as long as necessary to get the packet to its destination.

If the route is a short route, then route optimization may not be essential and may be optional, and the packet may be forwarded to MF/GW1 306 (shown as event 327). Because of the short time to route to MF/GW1 306, even if MN has moved to a VN, there may not be much additional delay to first route the packet to MF/GW1 306.

If the route is a long route, then in addition to forwarding the packet to MF/GW1 306 (shown as event 327), MF/GW3 316 may check to determine if MN 313 (i.e., HoA1c) has moved to away from its home network and onto a visited network. For example, MF/GW3 316 may check its own second layer of the DRID for the information about MN 313, which may be maintained in a memory, such as a cache. Since MN 313 is not connected to network #3, it is not likely that MF/GW3 316 would have binding information about MN 313 in its second layer of the DRID. Alternatively, MF/GW3 316 may query MF/GW1 306 for the information about MN 313.

According to an example embodiment, in order to avoid excessive messaging traffic, MF/GW3 316 may elect to not query MF/GW1 306 if the information about MN 313 is already in its second layer of the DRID, i.e., MF/GW3 316 may check its own second layer of the DRID prior to attempting to query MF/GW 1 306. To further reduce messaging traffic, MF/GW3 316 may decide to not query MF/GW1 306 even if the information about MN 313 is not in its second layer of the DRID. For example, MF/GW3 316 may decide to query MF/GW1 306 once every specified number of packets addressed to the HoA of MN 313 has been received and routed.

According to an example embodiment, as an alternative to querying MF/GW1 306, LM1 305 may inform the various MF/GWs. As an example, a MF/GW may send a packet addressed to a HoA to the HN of the HoA. A MF/GW in the HN of the HoA may determine from the LM of the HN or from its own second layer of the DRID that the MN has moved to a VN. The MF/GW of the HN may forward the packet to the MF/GW of the VN, as well as inform the MF/GW that originated the packet about the binding information. The MF/GW that originated the packet can store the binding information in its own second layer of the DRID.

If MN 313 is in its HN, it will use the HoA address to receive packets without requiring a CoA. LM1 305 may not need to store a binding between the HoA and a CoA for MN 313 and an associated mobility context does not need to be maintained in the first layer of the DRID. MF/GW 316 may assume that HoA1c (MN 313) is in its home network from the absence of VN information from its own second layer of DRID, from not being informed otherwise by MF/GW1 306, or from lack of a query of the MF/GW1 306. Alternatively, as MF/GW3 316 has determined that HoA1c (MN 313) is in its home network (e.g., from its own second layer of the DRID, from being informed by MF/GW1 306, or from a query of MF/GW1 306), MF/GW3 316 may store the information for HoA1c (MN 313) in its own second layer of the DRID as a non-visited HoA. Therefore, when future packets are sent from any communications node in network #3 to network #1, MF/GW3 316 will not need to query MF/GW1 306.

According to an example embodiment, in order to maintain a relatively small size for the second layer of the DRID, information in the second layer of the DRID may have an age indicator and when information reaches a specified age, the information may be removed. Alternatively, memory cleansing techniques may be periodically applied to the second layer of the DRID to retain only more recent information. Once information has been removed from the second layer of the DRID, a query of a MF/GW or information provided by the MF/GW may be needed to place the information back into the second layer of the DRID.

If MN 313 has moved to a visited network, e.g., network #2 as shown in FIG. 3b, LM1 305 may need to store a binding between the HoA (HoA1c) and the CoA (CoA2b) for MN 313. As the location is maintained in a hierarchical manner, the binding information in LM1 305 is between HoA (HoA1c) and the IP address of the MF/GW (MF/GW2) in the VN whereas the MF/GW (MF/GW2) in the visited network will maintain the binding between HoA (HoA1c) and the IP address of the AR (CoA2b) serving MN. When queried by MF/GW3 316, MF/GW1 306 may retrieve the binding information from LM1 305 and provide information related to the binding to MF/GW3 316. Alternatively, LM1 305 may directly inform MF/GW3 316. MF/GW3 316 may update its second layer of the DRID with the information provided by MF/GW1 306.

As shown in FIG. 3b, the packet may be tunneled using information stored by LM1 305 to MF/GW2 311 (shown as event 328) and AR 312 (shown as event 329), and then sent to MN 313 (shown as event 330). If MF/GW3 316 lacks the information that MN 313 is in a visited network and has send packets that are destined to HoA1c to MF/GW1 306, MF/GW1 306 may tunnel the packet to MF/GW2 311 in addition to informing MF/GW3 316 about the binding for MN 313. MF/GW3 316 will store this binding information in its second layer of DRID.

Figure 3C:
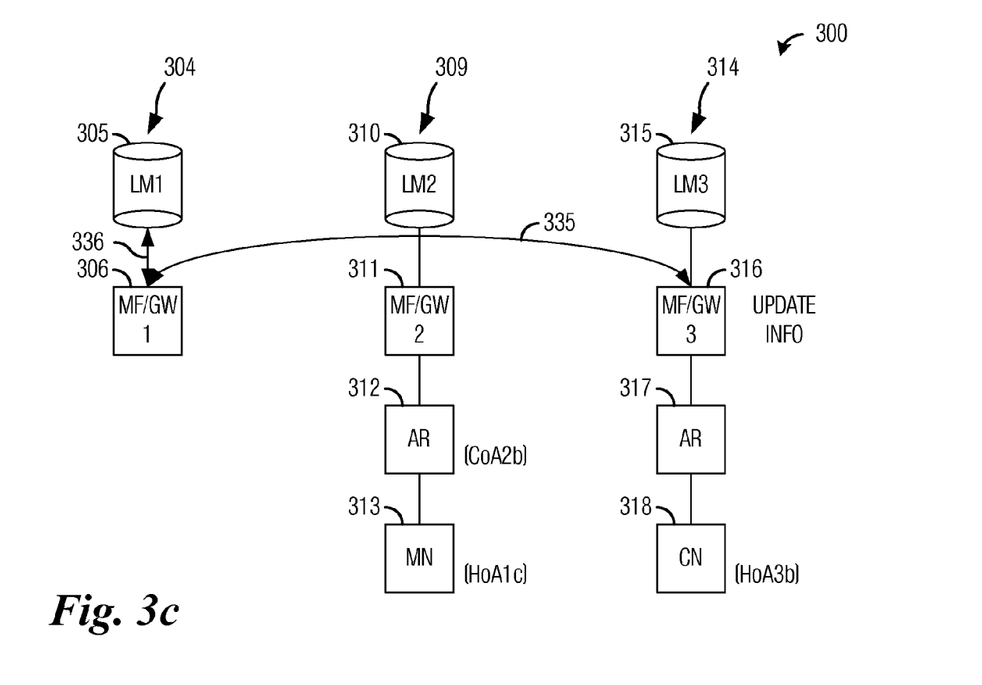

FIG. 3c illustrates messages exchanged in communications system 300 in a query between MF/GW3 316 and MF/GW1 306. MF/GW3 316 may query MF/GW1 306 (shown as event 335) to retrieve up-to-date information regarding a binding for HoA1c (MN 313). MF/GW1 306 may retrieve information for HoA1c from LM1 305 (shown as event 336) and send the information to MF/GW3 316 (also shown as event 335). Once MF/GW3 316 receives the binding information from MF/GW1 306, MF/GW3 316 may update its second layer of the DRID with the binding information.

Figure 3D:
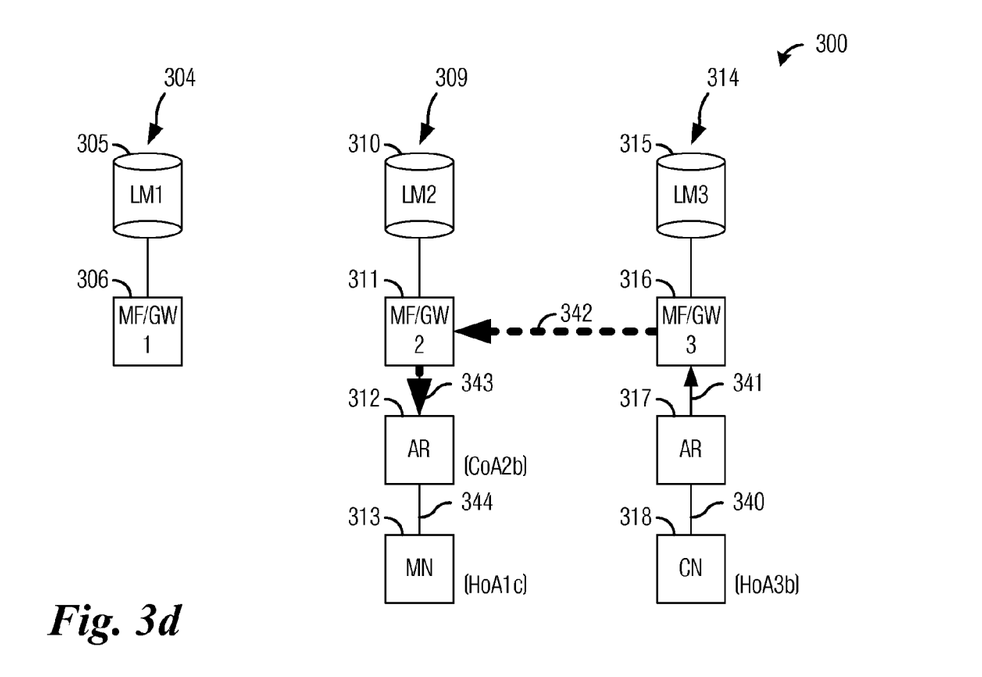

FIG. 3d illustrates messages exchanged in communications system 300 when CN 318 sends a packet with destination HoA1c, i.e., MN 313, when MF/GW3 316 already has information regarding HoA1c in its second layer of the DRID. With the information regarding HoA1c in its second layer of the DRID, when MF/GW3 316 has to route a packet destined for HoA1c (MN 313), which it has received from CN 318 (shown as event 340) via AR 317 (shown as event 341), MF/GW3 316 may check in its second layer of the DRID and determine that, for example, there is a binding between HoA1c and CoA2b (i.e., address of AR 312) or MF/GW2 311 if hierarchical location management is used. Hence, MF/GW3 316 may tunnel the packet directly to AR 312 via MF/GW2 311 instead of routing the packet to MF/GW1 306

(shown as event 342 and event 343). AR 312 may then send the packet to MN 313, i.e., HoA1c (shown as event 344).

According to an example embodiment, as the information regarding HoA1c (MN 313) in the second layer of the DRID held in MF/GW3 316 ages and potentially becomes discarded, MF/GW3 316 may need to query MF/GW1 306 to refresh the information. Alternatively, as information in the DRID is accessed, its age information may be reset, or adjusted, thereby preventing a situation wherein frequently accessed information is removed from the DRID, which may negatively impact route performance.

According to an example embodiment, in order to provide support for inter-provider communications systems, it may be possible to co-locate the MF with border gateways, through which inter-provider packets pass. Hence, packets between MNs and CNs that cross between communications systems operated by different operators may be able to take advantage of route optimization using the DRID and potentially achieve shorter routes.

Figure 4:
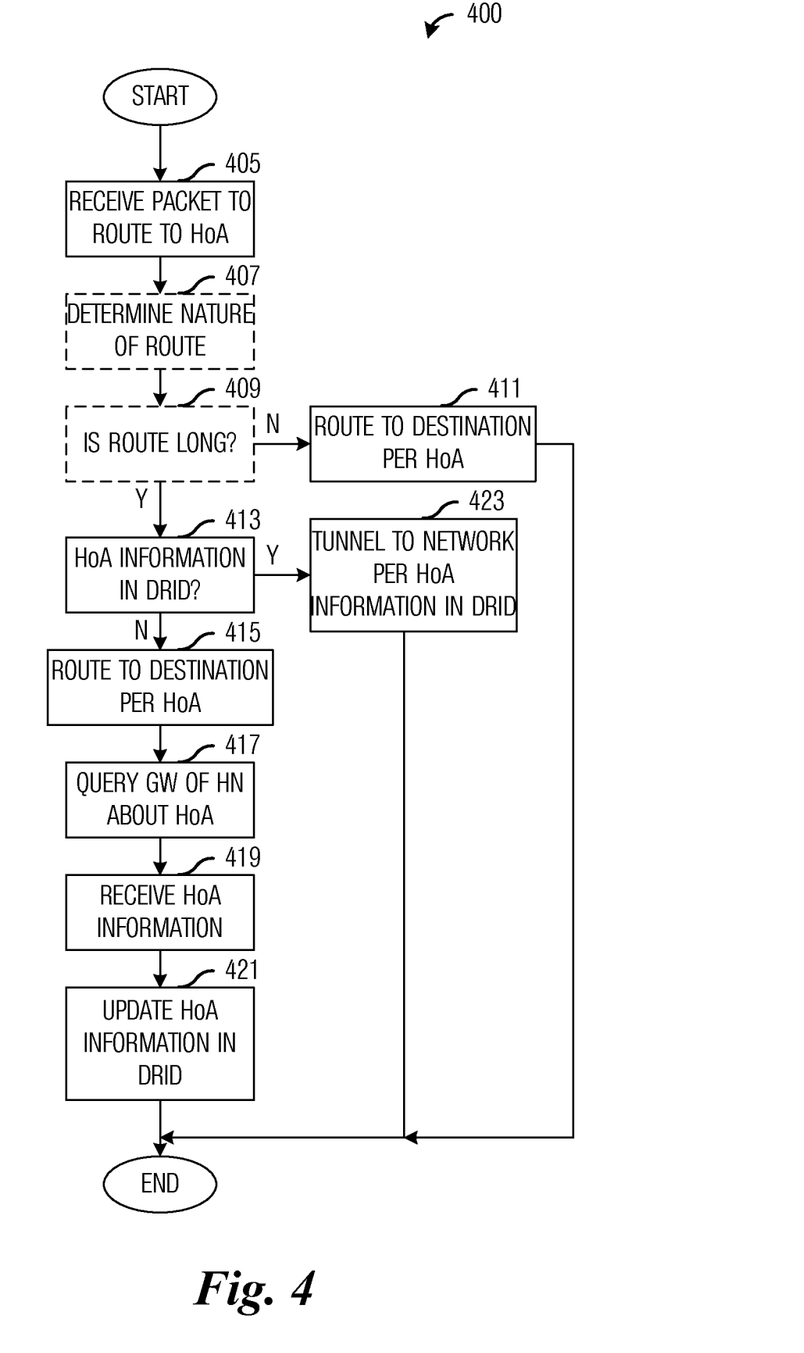
FIG. 4 illustrates an example flow diagram of MF/GW operations in a network entity of a network where a CN is attached, as the network entity routes a packet to its destination address according to example embodiments described herein.

FIG. 4 illustrates a flow diagram of MF/GW operations 400 in a network entity of network where a CN is attached, as the network entity routes a packet to its destination address. MF/GW operations 400 may be indicative of operations occurring in a network entity comprising a MF and a GW as the network entity routes a packet to its destination address. MF/GW operations 400 may implement a route optimization technique utilizing a DRID to potentially shorten routes of packets to their destination address, thereby reducing latency, needless resource utilization, probability of error, and so on. MF/GW operations 400 may occur while the network entity is in a normal operating mode.

MF/GW operations 400 may begin with the network entity receiving a packet to route, wherein the packet has a destination address of HoA (block 405). As discussed previously, the packet may be sent by a CN to a MN, where the MN has an address of HoA. The network entity may proceed based on a nature of the route to the HoA (optional), as well as if the network entity has previously (but not too long ago) routed another packet to the same HoA.

The network entity may optionally determine the nature of the route (block 407). According to an example embodiment, the route may either be a short route or a long route, wherein a long route may be a route that traverses a path that is longer (in terms of distance and/or time) than necessary to get the packet to its destination, while a short route is a route that transverses a path that is only as long as necessary to get the packet to its destination.

If the route is not a long route, i.e., the route is a short route (block 409), then the network entity may route the packet to its destination using the HoA (block 411). For example, the network entity may route the packet to its network, such as its HN, using subnet prefixes, and so forth.

However, if the route is a long route (block 409), then the network entity may need to perform route optimization using the DRID. If the route is a long route, then the network entity may check for the presence of information regarding the HoA in its second layer of the DRID (block 413). For example, the network entity may have previously routed a packet to the HoA and has queried a corresponding network entity of the HN of the MN with the HoA to retrieve information about the HoA and stored it in its second layer of the DRID. Alternatively, a LM in the HN of the MN has directly provided the information about the HoA to the network entity.

If there is no information regarding the HoA in the network entity's second layer of the DRID, then the network entity may route the packet to its destination using the HoA (block 415).

The network entity may also query the corresponding network entity of the HN of the MN with the HoA to retrieve information about the HoA (block 417). As discussed previously, in order to reduce messaging traffic, the network entity may decide to not query every corresponding network entity of a HN associated with each packet that it routes. For example, the network entity may maintain a count for each HoA of each packet that it routes and once the count for a particular HoA reaches a specified threshold, the network entity may query the corresponding network entity of the HN of the particular HoA. Alternatively, the network entity may measure a frequency of packets that it routes to a particular HoA and query corresponding network entities of those that exceed a specified frequency threshold. Alternatively, the MF/GW of the HN, upon receiving packets destined to the HoA, may inform the network entity information about the HoA.

Depending on where the MN is connected in relation to its HN, the corresponding network entity of the MN may store different information about the MN. For example, if the MN is still connected to its HN, the corresponding network entity will use HoA of the MN as its routing address so that it does not need a different IP address (e.g., a CoA of the MN) for routing. There is then no binding between the HoA and CoA and the LM of the MN will not need to store such information. When there is no such binding, the corresponding network entity of the MN will forward packets in the manner that the MN is connected to its HN.

While if the MN is connected to a VN, then the LM of the HN of the MN may store information about the HoA and its CoA in its first layer of the DRID. Upon receiving the query from the network entity, the corresponding network entity of the MN may access the LM of the HN and send information about the MN to the network entity.

The network entity may receive the information about the HoA (block 419) and save the information in its second layer of the DRID (block 421).

If the network entity has information about the HoA in its second layer of the DRID (block 413), then the network entity may make use of the information about the HoA to tunnel the packet directly to a network entity (an AR or the MF/GW, for example) of the network where the MN is currently connected (block 423).

Figure 5:
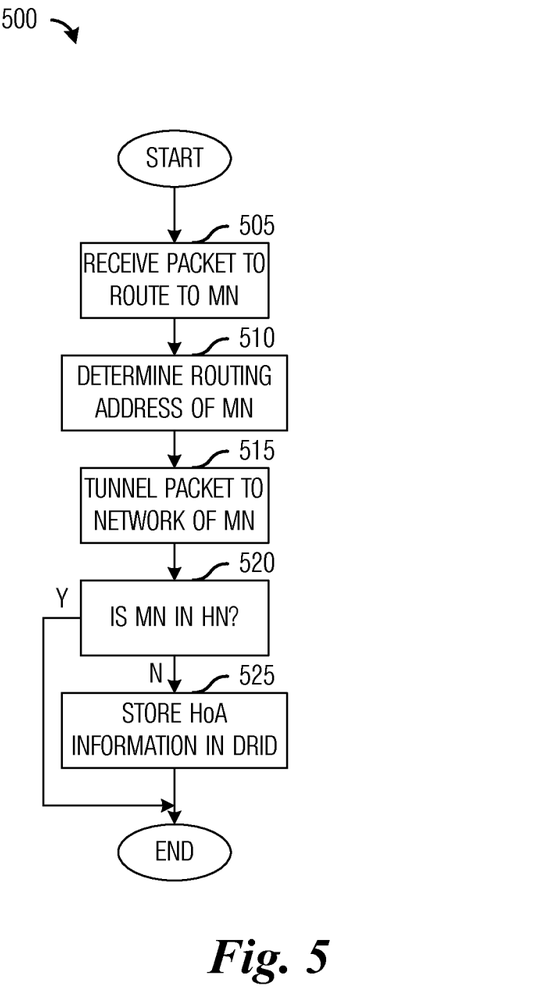
FIG. 5 illustrates an example flow diagram of MF/GW operations in a network entity of a HN of a MN, as the network entity receives a packet with a destination address being the HoA of the MN according to example embodiments described herein.

FIG. 5 illustrates a flow diagram of MF/GW operations 500 in a network entity of a HN of a MN, as the network entity receives a packet with a destination address being the HoA of the MN. MF/GW operations 500 may be indicative of operations occurring in a network entity comprising a MF and a GW as the network entity routes a packet to its destination address. MF/GW operations 500 may provide updates to a DRID depending on where the MN is connected. MF/GW operations 500 may occur while the network entity is in a normal operating mode.

MF/GW operations 500 may begin with the network entity receiving a packet to route to the MN, i.e., the packet has the MN's HoA as its destination address (block 505). The network entity may determine a routing address of the MN (block 510). If the MN is connected to its HN, then the routing address of the MN may be the same as the HoA assigned to the MN when it first connected to the HN so that there is no need to have a separate CoA for routing. Therefore, the LM of the HN may not have had to store information about the MN in its first layer of the DRID.

While, if the MN has left its HN and connected to a VN, then a network entity in the VN may have assigned the MN a new CoA. However, the HoA of the MN remains the same. When the MN connected with the VN, the LM of the HN may have stored information for the MN in its first layer of the DRID, such as a binding between the HoA of the MN and the new CoA assigned to the MN by the network entity in the VN.

The network entity may tunnel the packet to the MN (block 515). If the MN is in its HN, the network entity may route the packet directly to an AR of the MN, which may then send the packet to the MN. If the MN is connected to the VN, the network entity may tunnel the packet to an AR of the VN by way of the network entity in the VN, which may then send the packet to the MN. Meanwhile, the network entity may inform a network entity from which it has received the packet (e.g., the network entity of the CN) about the information about the MN.

If the MN is in the HN (block 520), then the LM of the HN may not need to store information about the MN in its first layer of the DRID. However, if the MN is not in the HN, then the LM of the HN may store information about the MN in its first layer of the DRID, or if there is already information for the MN in the first layer of the DRID, the LM of the HN may update the information in its first layer of the DRID (block 525).

Figure 6:
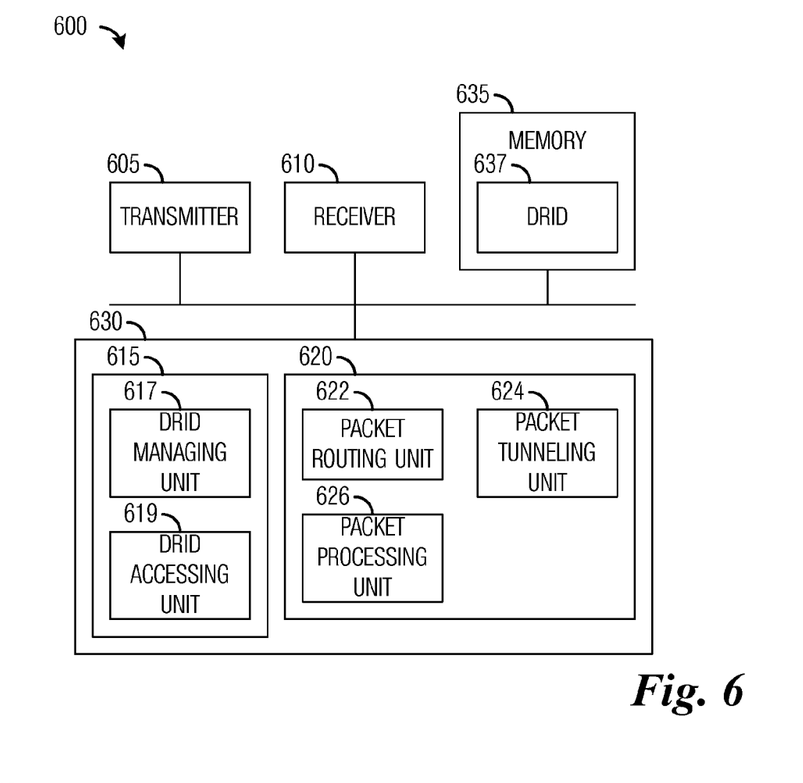
FIG. 6 illustrates an example device according to example embodiments described herein.

FIG. 6 provides an illustration of a device 600. Device 600 may be an implementation of a network entity, such as a combination MF and GW, of a communications system. Device 600 may be used to implement various ones of the embodiments discussed herein. As shown in FIG. 6, a transmitter 605 is configured to send messages, information, and so forth, and a receiver 610 is configured to receive messages, information, and so on. Transmitter 605 and receiver 610 may have a wireless interface, a wireline interface, or a combination thereof.

A MF 615 is configured to manage mobility information related to MNs connected in a network where device 600 is operating. A DRID managing unit 617 in MF 615 is configured to manage information related to the MNs in a second layer of the DRID, including storing the information, updating the information, removing the information (usage based, age based, and so on), and so forth. The information may include binding information between a HoA and a CoA or an AR, for example. A DRID accessing unit 619 in MF 615 is configured to access information stored in the DRID, including retrieving information from the DRID. As an example, the DRID may be accessed in a cache like manner utilizing a HoA of a MN.

If LM functionality is also implemented in device 600, MF 615 may also manage location information for MNs. DRID managing unit 617 is also configured to manage binding information for MNs that were initially connected to a network, i.e., their HN, including device 600 and have left their HN and moved onto a VN. DRID manage unit 617 manages information related to bindings between HoAs and GWs, including storing, updating, removing, and so on. DRID accessing unit 619 is also configured to access the binding information between HoAs and GWs.

A GW 620 is configured to process packets leaving the network as well as packets entering the network. A packet routing unit 622 is configured to determine a route for a packet based on the packet's destination address. A packet tunneling unit 624 is configured to establish a tunnel for a packet to another entity in a communications system. Both packet routing unit 622 and packet tunneling unit 624 may utilize the destination address of the packet, as well as information related to the destination of the packet that may be present in the DRID, to route and/or tunnel the packet. A packet processing unit 626 is configured to process outgoing and/or incoming packets, including encapsulation, de-encapsulation, destination address determination, and so forth.

A memory 635 is configured to store packets as they are received and/or before they are injected into the communications system, configuration information, and so forth. A DRID 637 is configured as a second layer of the DRID associated with device 600. Since the DRID is a distributed database, DRID 637 stores the portion of the DRID that is for use by device 600. If LM functionality is also implemented in device 600, DRID 637 is further configured as a first layer of the DRID associated with device 600.

The elements of device 600 may be implemented as specific hardware logic blocks. In an alternative, the elements of device 600 may be implemented as software executing in a processor, controller, application specific integrated circuit, or so on. In yet another alternative, the elements of device 600 may be implemented as a combination of software and/or hardware.

As an example, transmitter 605 and receiver 610 may be implemented as a specific hardware block, while MF 615 (including DRID managing unit 617 and DRID accessing unit 619) and GW 620 (including packet routing unit 622, packet tunneling unit 624, and packet processing unit 626) may be software modules executing in a processor 630, a microprocessor or a custom circuit or a custom compiled logic array of a field programmable logic array.

Figure 7:
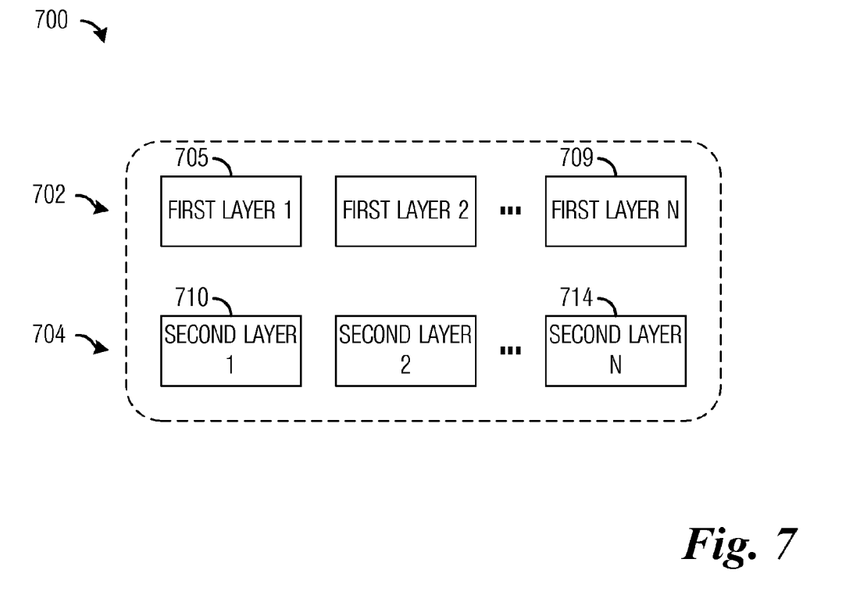
FIG. 7 illustrates an example DRID according to example embodiments described herein.

FIG. 7 illustrates a diagram of a DRID 700. DRID 700, as shown in FIG. 7, is a distributed memory arranged in a hierarchy. A first layer 702 of DRID 700 may be used to store binding information for HoAs and GWs of VNs and a second layer 704 of DRID 700 may be used to store information for HoAs and ARs to which a MN is attached. Furthermore, DRID 700 may be partitioned in multiple units, with each unit of first layer 702 being managed by a LM of each network in a communications system and each unit of second layer 704 being managed by a MF/GW of each network in the communications system. As an example, first layer 1 705 may be managed by a LM of network #1 and first layer N 709 may be managed by a LM of network #N. Similarly, second layer 1 710 may be managed by a MF/GW of network #1 and second layer N 714 may be managed by a MF/GW of network #N. It is noted that if the LM is co-located with the MF/GW, then the first layer of DRID and the second layer of DRID associated with the LM/MF/GW may be managed by the LM/MF/GW, a single network entity.

The above described embodiments of communications system 200, device 600, and DRID 700 may also be illustrated in terms of methods comprising functional steps and/or non-functional acts. The previous description and related flow diagrams illustrate steps and/or acts that may be performed in practicing example embodiments of the present invention. Usually, functional steps describe the invention in terms of results that are accomplished, whereas non-functional acts describe more specific actions for achieving a particular result. Although the functional steps and/or non-functional acts may be described or claimed in a particular order, the present invention is not necessarily limited to any particular ordering or combination of steps and/or acts. Further, the use (or non use) of steps and/or acts in the recitation of the claims—and in the description of the flow diagrams(s) for FIGS. 4 and 5—is used to indicate the desired specific use (or non-use) of such terms.

Although the present invention and its advantages have been described in detail, it should be understood that various changes, substitutions and alterations can be made herein without departing from the spirit and scope of the invention as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. In an access network entity of an access network, a method for delivering communication packets to a communications device, the method comprising:
   receiving a first packet destined for the communications device, wherein the communications device has a destination address;
   retrieving information related to the destination address from a second layer of a local portion, in the access network, of a distributed route information database, wherein the information comprises binding information about the destination address and a care of address for the communications device in a visiting network to which the communications device is connected, and wherein the access network is different from a home network of the communications device; and
   tunneling the first packet from the access network to the care of address in the visiting network.

2. The method of claim 1, wherein the care of address identifies a visiting network entity in the visiting network.

3. The method of claim 1, further comprising:
   routing a second packet to a home network entity of the home network, wherein the second packet is also destined for the destination address, wherein the home network is where the communications device initially connected, and wherein the home network is determined from the destination address; and
   storing information about the destination address in the second layer of the local portion of the distributed route information database.

4. The method of claim 3, wherein the home network entity tunnels the second packet to the care of address.

5. The method of claim 3, wherein storing information comprises:
   querying the home network entity about the destination address;
   receiving the information about the destination address; and
   storing the information in the second layer of the local portion of the distributed route information database.

6. The method of claim 5, wherein the querying, the receiving, and the storing the information occurs after routing a plurality of packets to the destination address.

7. The method of claim 3, wherein the routing and the storing occurs when the information about the destination address is not found in the second layer of the local portion of the distributed route information database.

8. The method of claim 3, wherein the information about the destination address is removed from the second layer of the local portion of the distributed route information database when the information has not been accessed in a specified amount of time.

9. The method of claim 1, wherein the retrieving information and the tunneling the first packet are performed when a route for the first packet to the destination address is a long route.

10. The method of claim 9, further comprising routing the first packet to the destination address when the route is a short route.

11. The method of claim 1, wherein the destination address comprises a home address of the communications device.

12. A network entity in an access network comprising:
    a mobility unit configured to retrieve information related to a destination address of a communications device for a packet destined for the destination address, wherein the information is retrieved from a second layer of a local portion, in the access network, of a distributed route information database, wherein the access network is different from a home network of the communications device, and wherein the information comprises binding information about the destination address and a care of address for the communications device in a visiting network to which the communications device is connected; and
    a gateway unit configured to tunnel the packet from the access network to the care of address in the visiting network.

13. The network entity of claim 12, wherein the mobility unit comprises:
    an accessing unit configured to retrieve information from the second layer of the local portion of the distributed route information database; and
    a managing unit configured to store information about the destination address in the second layer of the local portion of the distributed route information database.

14. The network entity of claim 13, wherein the managing unit is further configured to remove the information about the destination address when the information has not been accessed in a specified amount of time.

15. The network entity of claim 12, wherein the gateway unit comprises a packet tunneling unit configured to tunnel the packet to the care of address.

16. The network entity of claim 12, wherein the gateway unit is further configured to:
    route the packet to a home network entity of the home network, wherein the home network is where the communications device initially connected, wherein the home network is determined from the destination address, and
    wherein the mobility unit is further configured to store information about the destination address in a first layer of the local portion of the distributed route information database.

17. A computer program product for use by an access entity of a neighboring network when delivering communication packets to a device having a destination address in a home network, different from the neighboring network, the computer program product comprising computer executable instructions stored on a non-transitory, computer readable medium, in such a way that when executed by a processor, cause the access entity to:
    retrieve information related to a destination address of a communications device for a packet destined for the destination address, wherein the information is retrieved from a second layer of a local portion, in the access network, of a distributed route information database, wherein the access network is different from a home network of the communications device, and wherein the information comprises binding information about the destination address and a care of address for the communications device in a visiting network to which the communications device is connected; and tunnel the packet from the access network to the care of address in the visiting network.

18. The non-transitory computer program product of claim 17, the computer program product further causing when executed on the processor the network entity to:

retrieve information from the second layer of the local portion of the distributed route information database; and store information about the destination address in the second layer of the local portion of the distributed route information database.

19. The non-transitory computer program product of claim 18, the computer program product further causing when executed on the processor the network entity to:

remove the information about the destination address when the information has not been accessed in a specified amount of time.

20. The non-transitory computer program product of claim 17, the computer program product further causing when executed on the processor the network entity to:

tunnel the packet to the care of address.

21. The non-transitory computer program product of claim 17, the computer program product further causing when executed on the processor the network entity to:

route the packet to a home network entity of the home network, wherein the home network is where the communications device initially connected, wherein the home network is determined from the destination address; and store information about the destination address in a first layer of the local portion of the distributed route information database.

* * * * *